United States Patent
Liu (10) Patent No.: US 8,258,714 B2
(45) Date of Patent: Sep. 4, 2012

(54) LED CONTROLLER WITH PHASE-SHIFT DIMMING FUNCTION AND LED PHASE-SHIFT DIMMING CIRCUIT AND METHOD THEREOF

(75) Inventor: Jing-Meng Liu, Zhubei (TW)

(73) Assignee: Richtek Technology Corporation, R.O.C., Hsin-Chu (TW)

( * ) Notice: Subject to any disclaimer, the term of this patent is extended or adjusted under 35 U.S.C. 154(b) by 333 days.

(21) Appl. No.: 12/768,046

(22) Filed: Apr. 27, 2010

(65) Prior Publication Data
US 2010/0301764 A1 Dec. 2, 2010

Related U.S. Application Data

(60) Provisional application No. 61/181,277, filed on May 26, 2009.

(51) Int. Cl.
*H05B 41/16* (2006.01)

(52) U.S. Cl. ........ 315/250; 315/210; 315/307; 315/291; 315/247

(58) Field of Classification Search .................. 315/250, 315/210, 192, 307, 209 R, 291, 224, 308, 315/185 R, 247; 345/102, 690; 327/276, 327/135
See application file for complete search history.

(56) References Cited

U.S. PATENT DOCUMENTS

| | | | |
|---|---|---|---|
| 6,707,264 B2 * | 3/2004 | Lin et al. | 315/307 |
| 7,560,677 B2 * | 7/2009 | Lyons et al. | 250/205 |
| 8,058,810 B2 * | 11/2011 | Chen et al. | 315/209 R |
| 2007/0296686 A1 * | 12/2007 | Yoo | 345/102 |
| 2009/0218954 A1 * | 9/2009 | Lin et al. | 315/250 |
| 2009/0225020 A1 * | 9/2009 | Ran et al. | 345/102 |
| 2010/0283397 A1 * | 11/2010 | Chen et al. | 315/192 |

* cited by examiner

*Primary Examiner* — Vibol Tan
(74) *Attorney, Agent, or Firm* — Tung & Associates (57) ABSTRACT

The present invention discloses an LED controller with phase-shift dimming function and an LED Phase-Shift dimming circuit and method thereof. The LED controller includes: a power circuit for supplying DC power to multiple LED channels; and an LED phase-shift dimming circuit for receiving a pulse width modulation (PWM) input signal and generating multiple phase-shifted PWM signals with a shifted phase between one another, wherein a turn-ON timing of each of the multiple phase-shifted PWM signals follows a turn-OFF timing of a previous PWM signal which is the input PWM signal or a previous one of the multiple phase-shifted PWM signals.

21 Claims, 12 Drawing Sheets

LED CONTROLLER WITH PHASE-SHIFT DIMMING FUNCTION AND LED PHASE-SHIFT DIMMING CIRCUIT AND METHOD THEREOF

CROSS REFERENCE TO RELATED APPLICATIONS

This application claims the benefit of Provisional U.S. Patent Application No. 61/181,277, filed May 26, 2009, which is incorporated by reference herein.

BACKGROUND OF THE INVENTION

1. Field of Invention

The present invention relates to an LED controller with phase-shift dimming function; particularly, it relates to an LED controller controlling the brightness of multiple LED channels with a shifted phase. The present invention also relates to an LED phase-shift dimming circuit and an LED phase-shift dimming control method for controlling multiple LED channels.

2. Description of Related Art

Figure 1:
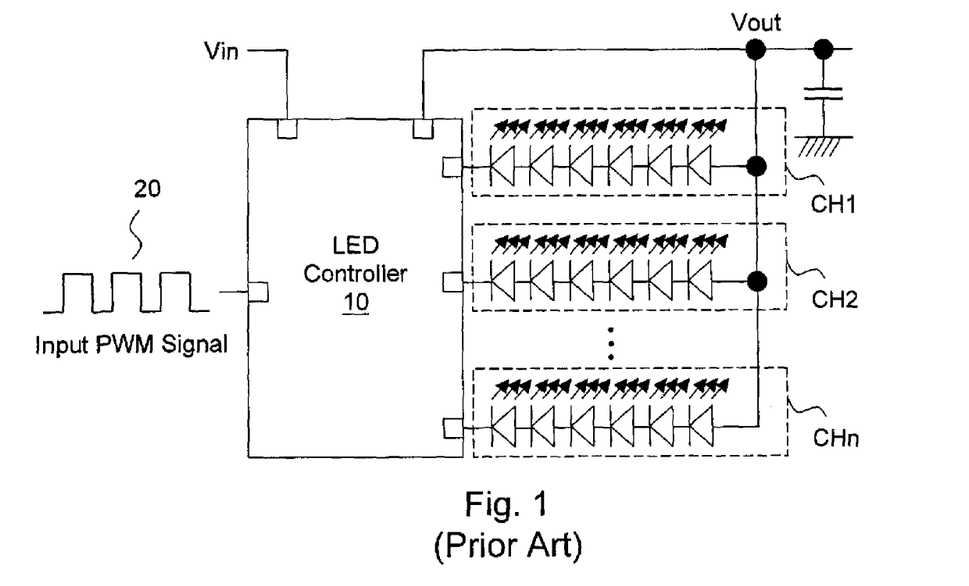
FIG. 1 shows a circuitry of a prior art LED controller.
Figure 2:
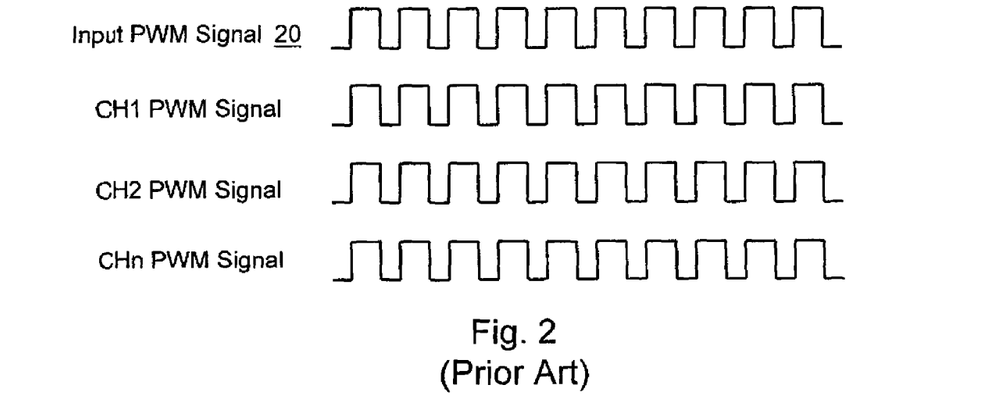
FIG. 2 shows the signal waveforms of FIG. 1.

FIG. 1 shows a conventional circuitry, wherein an LED controller 10 controls multiple LED channels (first LED channel CH1 to nth LED channel CHn). The LED brightness can be adjusted from the full brightness downward by an input pulse width modulation (PWM) signal 20. A duty ratio of the input PWM signal 20 determines the ON-time of the LEDs, and the higher the duty ratio is, the brighter the LEDs are. In this circuitry, all the LED channels CH1-CHn synchronously correspond to the input PWM signal 20, as shown in FIG. 2. In other words, all the LEDs turn on and off simultaneously. The drawback of this arrangement is that the brightness of the LEDs changes too sharply between ON and OFF. This reduces image quality, and it causes more interferences to the power supply circuit.

In view of the foregoing, the present invention provides an LED controller with phase-shift dimming function; the present invention also provides an LED phase-shift dimming circuit and a method thereof.

SUMMARY OF THE INVENTION

The first objective of the present invention is to provide an LED controller with phase-shift dimming function.

The second objective of the present invention is to provide an LED phase-shift dimming circuit.

The third objective of the present invention is to provide an LED phase-shift dimming control method for controlling multiple LED channels.

According to one of the preferred embodiments, in one duty cycle of the input PWM signal, the turn-ON timings of the LED channels are shifted from one another.

To achieve the objectives mentioned above, from one perspective, the present invention provides an LED controller with phase-shift dimming function, comprising: a power circuit for supplying DC power to multiple LED channels; and an LED phase-shift dimming circuit for receiving an input PWM signal and generating multiple phase-shifted PWM signals with a shifted phase between one another, wherein a turn-ON timing of each of the multiple phase-shifted PWM signals follows a turn-OFF timing of a previous PWM signal which is the input PWM signal or a previous one of the multiple phase-shifted PWM signals.

From another perspective, the present invention provides an LED phase-shift dimming circuit for receiving an input PWM signal and outputting multiple phase-shifted PWM signals with a shifted phase between one another, the LED phase-shift dimming circuit comprising multiple delay locked loops (DLLs) coupled in series, wherein each DLL calculates a pulse width of a received PWM signal by a high frequency clock signal and generates the phase-shifted PWM signal with the same pulse width as the received PWM signal, wherein a turn-ON timing of each of the multiple phase-shifted PWM signals follows a turn-OFF timing of a previous PWM signal which is the input PWM signal or a previous one of the multiple phase-shifted PWM signals.

From another perspective, the present invention provides an LED phase-shift dimming circuit for receiving an input PWM signal and outputting multiple phase-shifted PWM signals with a shifted phase between one another, the LED phase-shift dimming circuit comprising multiple pulse width mirrors coupled in series, wherein each pulse width mirror includes: an edge detector for detecting a rising and/or a falling edge of a PWM signal received by the pulse width mirror; a pulse width memory circuit for memorizing a pulse width of the received PWM signal; and a pulse width generator for generating the phase-shifted PWM signal with the same pulse width as the received PWM signal.

From another perspective, the present invention provides an LED phase-shift dimming circuit for receiving an input PWM signal and outputting multiple phase-shifted PWM signals with a shifted phase between one another, the LED phase-shift dimming circuit comprising multiple pulse width mirrors coupled in series, wherein each pulse width mirror includes: an edge detector for detecting a rising and/or a falling edge of a PWM signal received by the pulse width mirror; a duty-to-ramp circuit for generating a ramp signal according to a duty of the received PWM signal; and a pulse width generator for generating the phase-shifted PWM signal with the same pulse width as the received PWM signal.

From another perspective, the present invention provides an LED phase-shift dimming control method for controlling multiple channels of LEDs, comprising: receiving an input PWM signal; and duplicating and converting the input PWM signal to multiple phase-shifted PWM signals with a shifted phase between one another for corresponding LED channels respectively, wherein a turn-ON timing of each of the multiple phase-shifted PWM signals follows a turn-OFF timing of a previous PWM signal which is the input PWM signal or a previous one of the multiple phase-shifted PWM signals.

The objectives, technical details, features, and effects of the present invention will be better understood with regard to the detailed description of the embodiments below.

DESCRIPTION OF THE PREFERRED EMBODIMENTS

The concept of the present invention is to turn ON different LED channels at different timings such that these LED channels are turned ON and OFF asynchronously.

Figure 3:
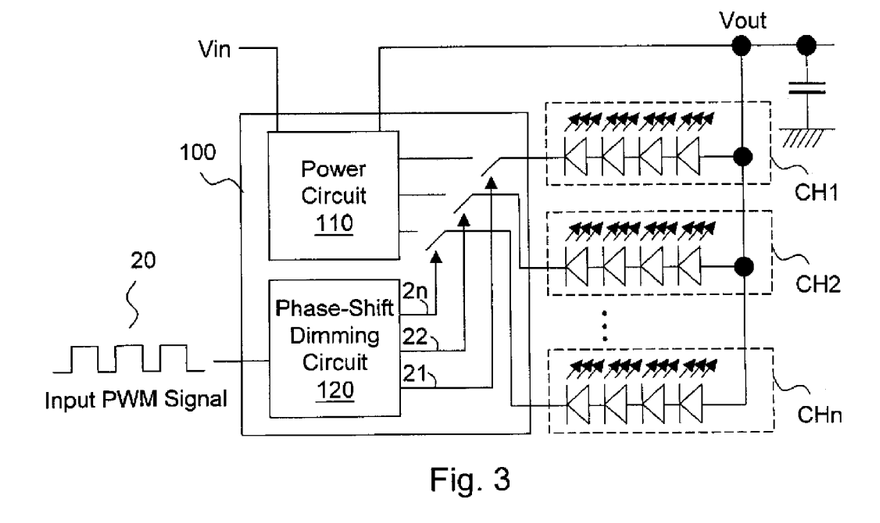
FIG. 3 shows a circuitry of an embodiment of the present invention.

Please refer to FIG. 3, which shows an embodiment of the present invention. An LED controller 100 includes a power circuit 110 for controlling power conversion from Vin to Vout in order to supply DC power to multiple LED channels; and a phase-shift dimming circuit 120 for receiving the input PWM signal 20 and duplicating the input PWM signal 20 to output multiple different PWM signals 21-2n with a shifted phase between one another. As shown in the figure, the PWM signals 21-2n operate corresponding switches to control the timings of the respective LED channels CH1-Chn to be connected with the power circuit 110. Because the PWM signals 21-2n have a shifted phase between one another, the turn-ON timings of the LED channels CH1-CHn are asynchronous, such that there will be no drastic change in the brightness generated by the entire LED circuitry.

Figure 4:
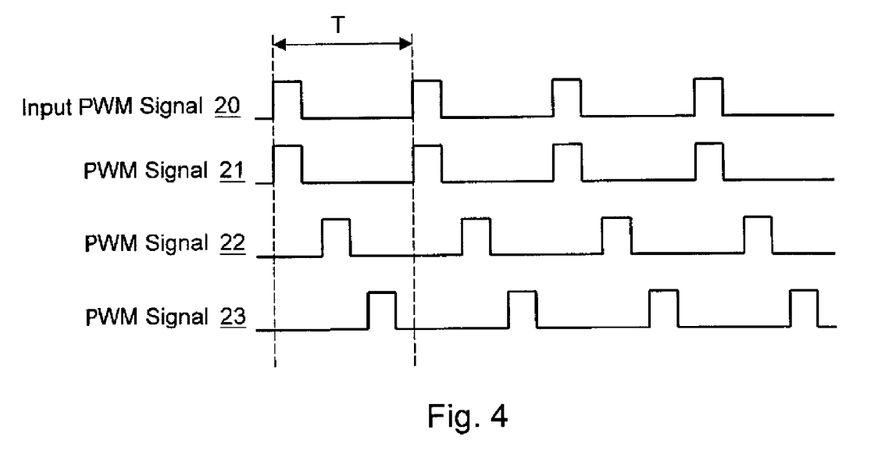
FIG. 4 shows signal waveforms of an embodiment of the present invention.

FIG. 4 shows one possible PWM signal waveforms. Taking n=3 as an example of FIG. 3, the turn-ON timings of the PWM signals 21-23 are uniformly distributed in one duty cycle T. To embody this arrangement, a complete frequency multiplication phase locked loop is required, which consumes a relatively larger circuit area and electrical power.

Figure 5:
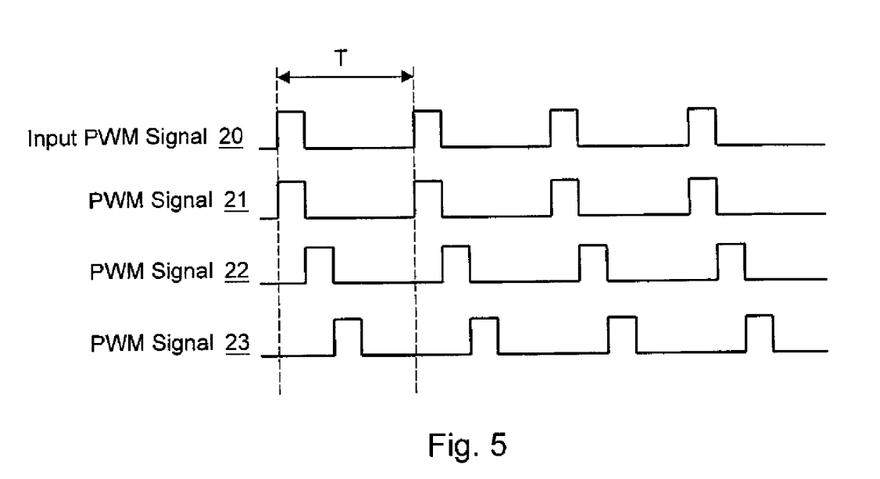
FIG. 5 shows signal waveforms of another embodiment of the present invention.

FIG. 4 is an embodiment that the turn-ON timings of the multiple LED channels are uniformly distributed in one duty cycle T. However, it is not necessary for the turn-ON timings of the multiple LED channels to be uniformly distributed in one duty cycle T; in fact the turn-ON timings only need to be shifted from one another. FIG. 5 shows another embodiment of the PWM signal waveform. As shown in the figure, the turn-ON timing of the PWM signal 21 follows the rising edge of the input PWM signal 20 (assuming that high level is ON), and the turn-ON timing of each of the other PWM signals 22 and 23 follows the turn-OFF timing (assuming that low level is OFF, the falling edge) of a previous PWM signal, such that different LED channels CH1-CH3 turn ON and OFF asynchronously in a duty cycle T.

Figure 6:
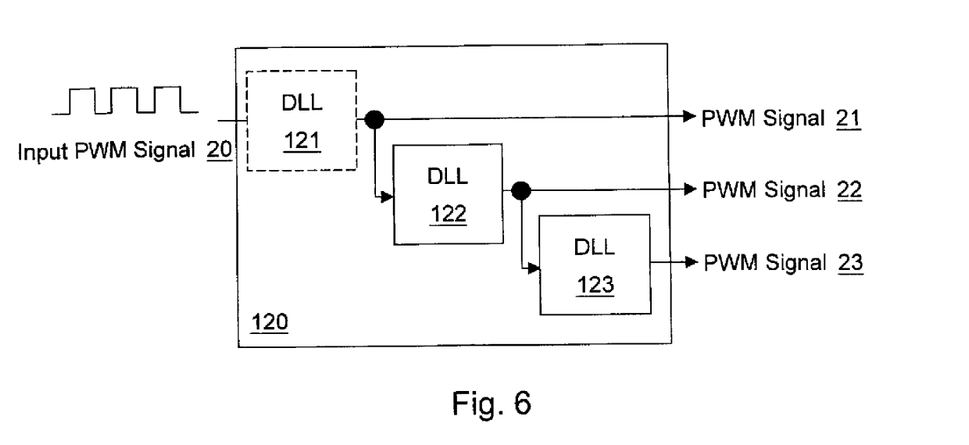
FIG. 6 shows an embodiment of the phase-shift dimming circuit according to the present invention.

FIG. 6 shows an embodiment of the phase-shift dimming circuit 120 which is capable of generating the signal waveforms shown in FIG. 5. The phase-shift dimming circuit 120 includes a plurality of delay locked loops (DLLs) 121-123. Each DLL duplicates a PWM signal which it receives and generates a phase-shifted PWM signal as a PWM signal for the next LED channel. In this embodiment, the DLL 121 may or may not be provided. The aforementioned DLL may be, but not necessarily, a standard complete DLL; instead, it can be a simplified DLL in which the circuit for processing delay time is omitted. The simplified DLL triggers the phase-shifted PWM signal by a rising or a falling edge of the previous PWM signal, as described in the following.

Figure 7:
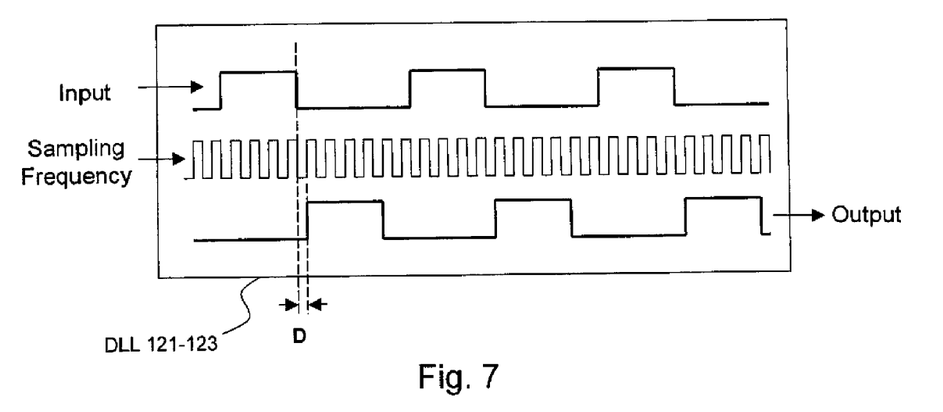
FIG. 7 illustrates how a phase-shifted PWM signal is duplicated by a DLL according to the present invention.

FIG. 7 shows how the simplified DLL duplicates a PWM signal to generate a phase-shifted PWM signal. The DLL calculates a pulse width of the input PWM signal by a high frequency clock signal (sampling frequency) and generates the phase-shifted PWM signal with the same pulse width. Note that due to processing speed of circuit devices involved, a time delay may exist between the end of the sampling and and the generation of the phase-shifted PWM signal, that is, as shown in the figure, a delay time D may exist between the falling edge of the input PWM signal and the rising edge of the output PWM signal. This delay time D does not negatively impact the objective of the present invention, "to shift the turn-ON timing of the LED channels from one another", so it is acceptable. In other words, the term "follow" in the context of this specification, such as in the aforementioned description "the turn-ON timing of each of the other PWM signals 22 and 23 follows the turn-OFF timing (assuming that low level is OFF, the falling edge) of a previous PWM signal", may mean either at substantially the same time as, or with a short insignificant delay of, a previous PWM signal.

Figure 8A:
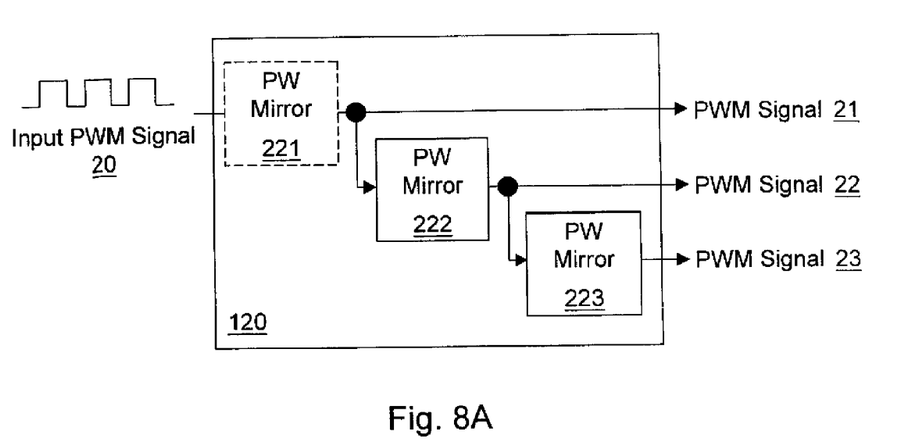
FIG. 8A shows another embodiment of the phase-shift dimming circuit according to the present invention.

FIG. 8A shows another embodiment of the phase-shift dimming circuit 120 which generates the signal waveforms shown in FIG. 5. The phase-shift dimming circuit 120 includes multiple pulse width mirrors (PW mirrors) 221-223 instead of DLLs. In the embodiment, the PW mirror 221 may or may not be provided.

The function of the PW mirror also is to duplicate a received PWM signal, and to generate a phase-shifted PWM signal as the PWM signal for the next LED channel. However, different from DLL, the PW mirror does not calculate the pulse width of the input PWM signal by a high frequency clock signal; the operation mechanism is different. For this reason, we use the term "pulse width mirror" to distinguish it from the DLL.

Figure 8B:
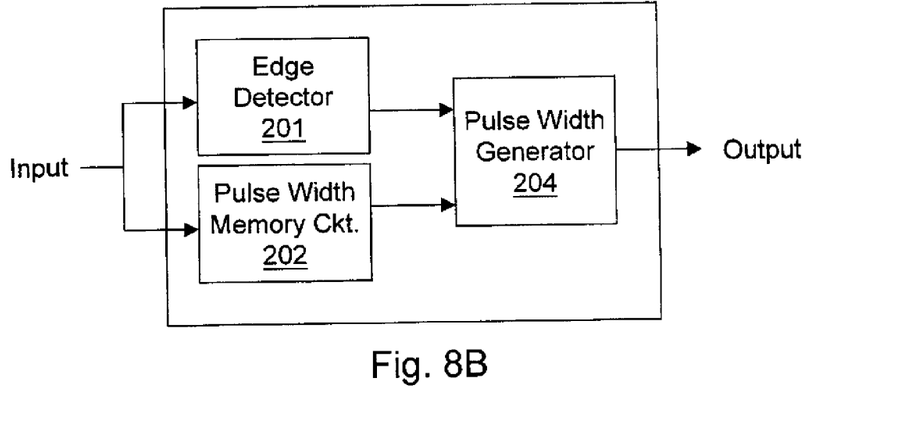
FIGS. 8B and 8C shows two embodiments of the pulse width mirror of the present invention.

FIG. 8B shows a first embodiment of the PW mirror. In this embodiment, the PW mirror includes an edge detector 201, a pulse width memory circuit 202, and a pulse width generator 204. The edge detector 201 detects a rising and/or a falling edge of the received PWM signal, and the pulse width memory circuit 202 memorizes the pulse width of the received PWM signal. According to these two pieces of information, the pulse width generator 204 can generate the phase-shifted PWM signal. More specific embodiments of the circuitry shown in FIG. 8B will be described with reference to the examples shown in FIGS. 9-11.

Figure 8C:
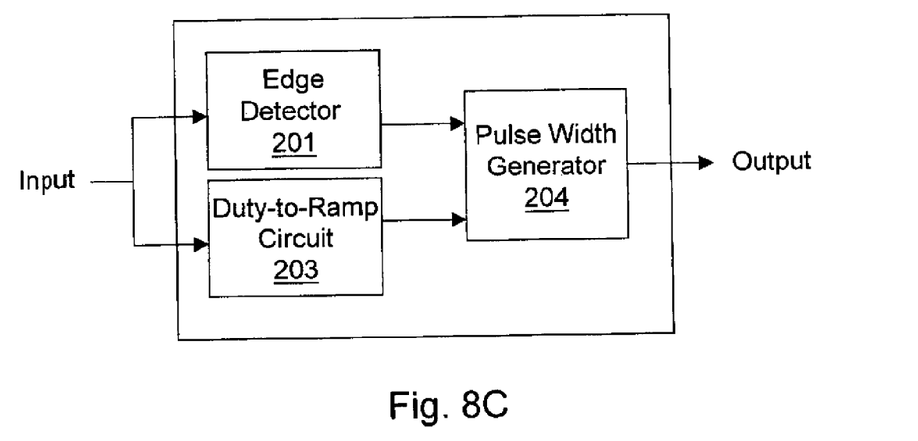

FIG. 8C shows another embodiment of the PW mirror. In this embodiment, the PW mirror includes an edge detector 201, a duty-to-ramp circuit 203, and a pulse width generator 204. The edge detector 201 detects a rising and/or a falling edge of the received PWM signal, and the duty-to-ramp circuit 203 generates a corresponding ramp signal according to the duty of the received PWM signal. According to these two pieces of information, the pulse width generator 204 can generate the phase-shifted PWM signal. More specific embodiments of the circuitry shown in FIG. 8C will be described with reference to the examples shown in FIG. 12 and afterward.

Figure 9:
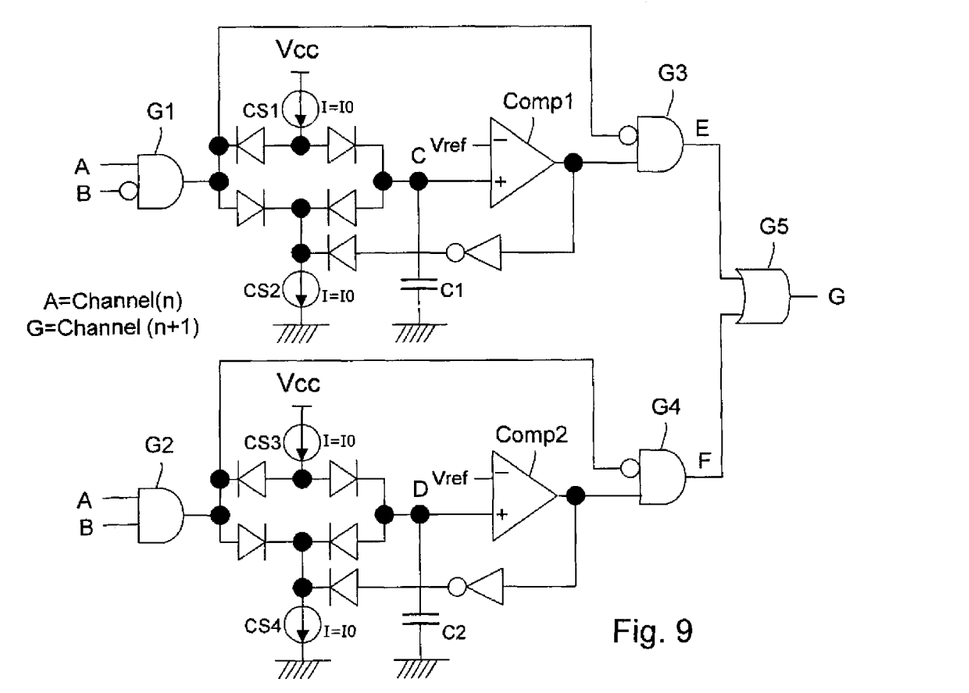
FIG. 9 shows a more detailed hardware embodiment of the pulse width mirror of FIG. 8B.
Figure 10:
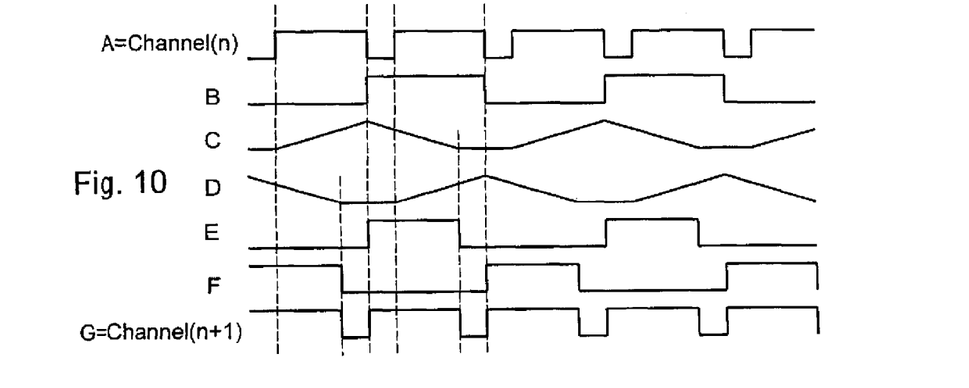
FIG. 10 shows the signal waveforms of several nodes in FIG. 9.

FIG. 9 shows a more detailed hardware embodiment of FIG. 8B. FIG. 10 shows the signal waveforms of several nodes in FIG. 9. With reference to FIG. 9 and FIG. 10, we will explain how the PW mirror duplicates and delays a received PWM signal. As shown in the figures, signal A is an inputted PWM signal (the input PWM signal 20 or the PWM signal of the previous LED channel (Channel n)), and signal G is the duplicated phase-shifted PWM signal for controlling the next LED channel (Channel n+1). Signal B is obtained by the falling edge of signal A (signal B switches high at the first falling edge of signal A, and switches low at the second falling edge, and so on; that is, signal B is a standard frequency division signal triggered by the falling edge of signal A). In FIG. 9, the function of the upper circuit is to generate signal E according to signal A, and the function of the lower circuit is to generate signal F according to signal A. As shown in FIG. 10, signal E duplicates the first, third, fifth, . . . duty cycles of signal A, and signal F duplicates the second, fourth, sixth, . . . duty cycles of signal A, but with delay (the rising edges of signal E and F follow corresponding falling edges of signal A). Therefore, signal G can be obtained by combining signal E and F via an OR gate G5.

Please refer to the upper circuit of FIG. 9. When signal A switches from low level to high level in the first duty cycle and signal B is at low level, the output of the logic gate G1 is at high level. The current I(=I0) from an upper charging current source CS1 can not flow leftward, and therefore it goes right to charge a capacitor C1; thus, signal C ramps up till signal A switches low. As signal A switches low, the capacitor C1 is discharged by current I(=I0) via a lower discharging current source CS2. The charging time and discharging time of the capacitor C1 are equal; hence, the voltage stored in the capacitor C1 (voltage at node C) is equivalent to an analog memory of the pulse width of signal A. Vref is set to determine the lowest level of signal C, when signal C is not at the lowest level, the output of the comparator Comp1 is at high level. A logic gate G3 receives the output of the comparator Comp1, and a reversed signal of the output of the logic gate G1. That is, when the output of the logic gate G1 is at high level, the output of the comparator Comp1 is masked. Only when the output of the logic gate G1 is at low level, can the output of the comparator Comp1 pass through the logic gate G3. Therefore, signal E is at high level only when the capacitor C1 is discharged, and signal E is at low level in the rest of the time as shown in FIG. 10. In other words, signal E duplicates, with delay, the first, third, fifth, . . . duty cycles of signal A. Similarly, the lower circuit in FIG. 9 duplicates and delays the second, fourth, sixth, . . . duty cycles to generate signal F. Signal F and signal E are inputted to the OR gate G5, so the signal G outputted from the OR gate G5 is duplicated from signal A, but with a delay of one ON-time period. In the aforementioned circuitry, the logic gates G1 and G2 correspond to the edged detector 201 in FIG. 8B; the current sources CS1-CS4 and the capacitors C1 and C2 correspond to the pulse width memory circuit 202; and the comparators Comp1 and Comp2 and the logic gates G3-G5 correspond to the pulse width generator 204, wherein the pulse width generator 204 determines the pulse width of the phase-shifted PWM signal according to the discharging time of the capacitors.

Figure 11:
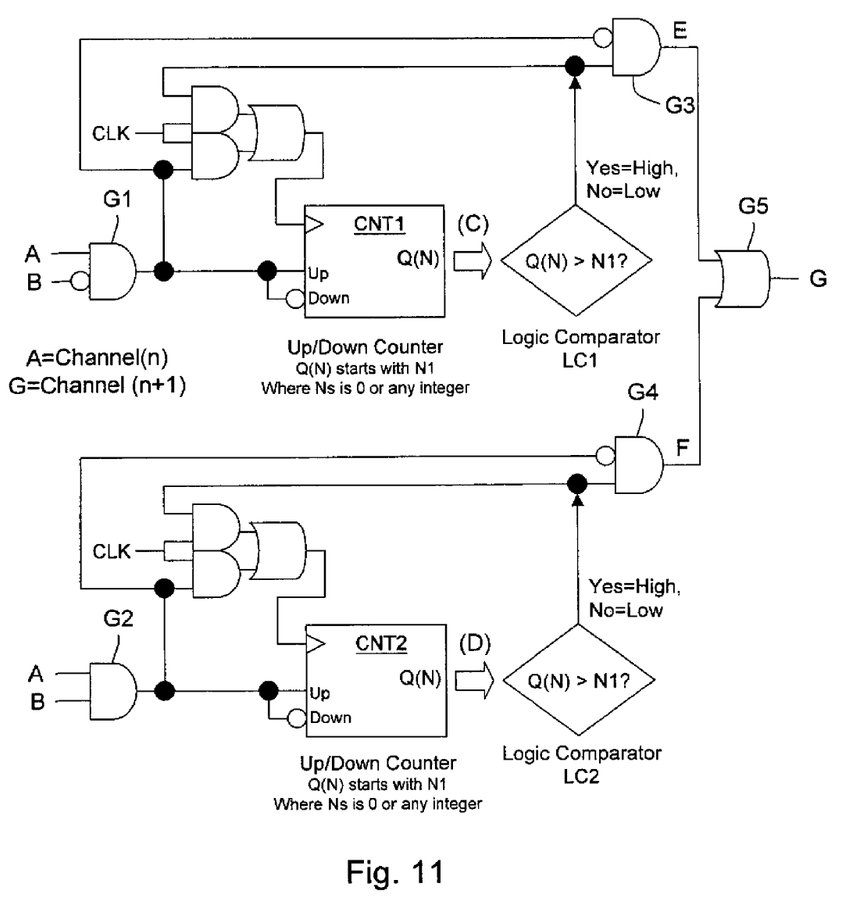
FIG. 11 shows another more detailed hardware embodiment of the pulse width mirror of FIG. 8B.

FIG. 11 shows another embodiment of the PW mirror, which is a digital form to embody FIGS. 9 and 10. In this embodiment, the capacitors C1 and C2 in FIGS. 9 and 10 are replaced by counters CNT1 and CNT2; their up/down counts correspond to charging/discharging in the previous embodiment. A predetermined setting N1 corresponds to Vref in FIG. 9. In addition, the comparators Comp1 and Comp2 are replaced by logic comparators LC1 and LC2 in this embodiment. Referring to FIGS. 10 and 11, when signal A switches from low level to high level in the first duty cycle and signal B is at low level, the counter CNT1 starts counting up from the predetermined setting N1, and the counting corresponds to memorizing the pulse width of signal A. When the output Q(N) of the counter CNT1 is greater than the predetermined setting N1, the logic comparator LC1 outputs high, otherwise low. The logic gate G3 receives the output from the logic comparator LC1 and the reversed output signal of the logic gate G1, that is, when the output of the logic gate G1 is at high level, the output of the logic comparator LC1 is masked, and only when the output of the logic gate G1 is at low level, the output of the logic comparator LC1 passes through the logic gate G3. Therefore, signal E is at high level when the counter CNT1 is counting down from a peak value to N1, and at low level in the rest of the time. In other words, signal E duplicates and delays the first, the third, the fifth, . . . duty cycles. Signal F is similar. In the circuitry mentioned above, the logic gates G1 and G2 correspond to the edge detector 201 in FIG. 8B; the counter CNT1 and CNT2 correspond to the pulse width memory circuit 202 in FIG. 8B; and the logic comparators LC1 and LC2 and the logic gates G3-G5 correspond to the pulse width generator 204 in FIG. 8B, wherein the pulse width generator 204 determines the pulse width of the outputted PWM signal according to the down counting time of the pulse width generator 204.

Those skilled in this art can readily conceive other hardware circuits to embody FIG. 8B, from the spirit of the embodiments shown in FIGS. 9 and 11. The scope of the present invention is not limited within the two embodiments.

Figure 12:
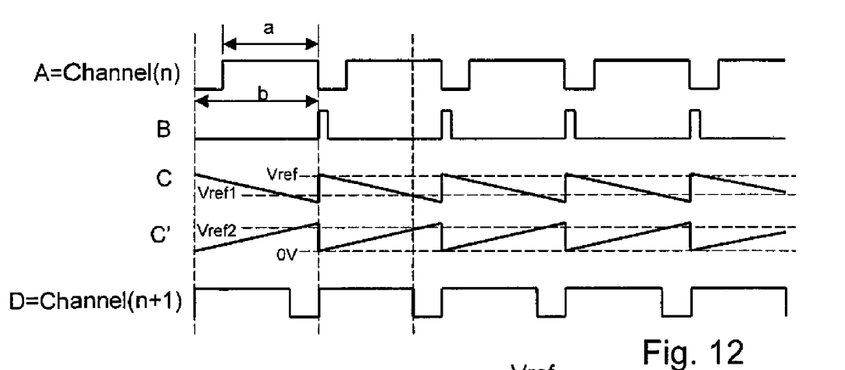
FIG. 12 shows signal waveforms embodying the pulse width mirror shown in FIG. 8C.

Hereinafter we will describe several hardware examples embodying FIG. 8C. Please refer to FIG. 12 first. In FIG. 12, signal A is the input PWM signal 20 or the PWM signal of a previous LED channel (Channel n), and signal D is a phase-shifted PWM signal duplicated from signal A with a shifted phase for controlling the next LED channel (Channel n+1). Signal B is a short pulse signal obtained from the falling edge of signal A. Signal C is pulled up to Vref at the falling edge of signal A, thereafter decreasing till the next falling edge of signal A, and then it is pulled up to Vref again. Or, alternatively, signal C' is reset to a low level at the falling edge of signal A, thereafter increasing till the next falling edge of signal A, and then it is reset to the low level again. Vref1 and Vref2 may be any level between 0V (ground) and Vref.

Figure 13:
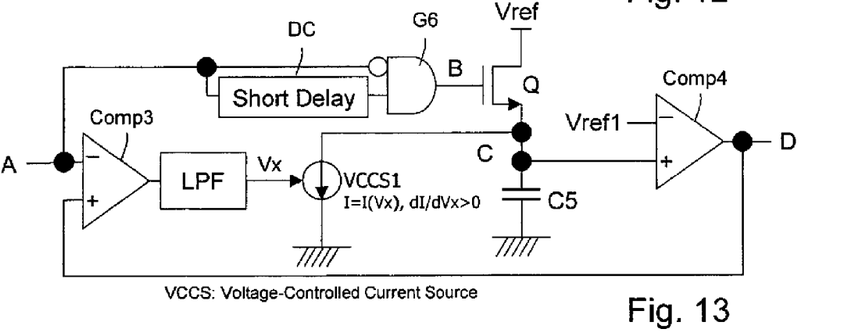
FIGS. 13-22 show several more detailed hardware embodiments of the pulse width mirror shown in FIG. 8C.

For better understanding the meaning of the waveforms shown in FIG. 12, let us first explain how they work by a hardware embodiment shown in FIG. 13; however, the waveforms shown in FIG. 12 can be embodied by various other circuits than FIG. 13, and therefore the present invention should not be limited thereto. Please refer to FIGS. 12 and 13. When signal A switches to low level, signal C is pulled up to Vref. Thus, the output from the comparator Comp4, i.e., signal D, is at high level. The capacitor C5 is discharged through a first voltage-controlled current source VCCS1, so signal C slowly decreases to Vref1. When signal C drops to Vref1, the output (signal D) from the comparator Comp4 switches to low level. In other words, signal A and signal D each has its own duty ratio, d %(A) and d %(D). (The duty ratio is defined as: the percentage of ON time a in a duty cycle b, a/b.) When d %(A)>d %(D), the time that the output signal of the comparator Comp3 stays at low level is longer than the time that it stays at high level. The voltage Vx, which is obtained by filtering the output signal of the comparator Comp3 by a low-pass filter LPF, is at a relatively low level, so the current source VCCS1 generates a relatively low current; thus, the time required for the capacitor C5 to discharge from Vref to Vref1 is increased, that is, d %(D) is increased. When d %(A)<d %(D), the time that the output signal of the comparator Comp 3 stays at high level is longer than the time that it stays at low level. The voltage Vx, which is obtained by filtering the output signal of the comparator Comp3 by a low-pass filter LPF, is at a relative high level, so the current source VCCS1 generates a relatively high current; thus the time required for the capacitor C5 to discharge from Vref to Vref1 is decreased, that is, d %(D) is decreased. In short, when d %(A)>d %(D), d %(D) is increased; when d %(A)<d %(D), d %(D) is decreased. In the final state, d %(D) is balanced at d %(A)=d %(D). Hence, the circuit in FIG. 13 realizes the signals A, B, C and D in FIG. 12. By similar analysis, it can be understood that the circuit in FIG. 14 realizes the signals A, B, C' and D in FIG. 12. As such, we can duplicate signal A to generate signal D with the same duty cycle, but delayed from signal A with an ON time a; that is, we can duplicate the input PWM signal 20 or the PWM signal of the previous LED channel (Channel n), to generate a phase-shifted PWM signal for controlling the next LED channel (Channel n+1).

The signal waveforms in FIG. 12 can be embodied by different ways, and FIGS. 13-19 show various other embodiments. Those skilled in this art can readily conceive other hardware circuits to embody FIG. 8C, from the spirit of the embodiments shown in FIGS. 13-19. The scope of the present invention is not limited within these embodiments.

Figure 14:
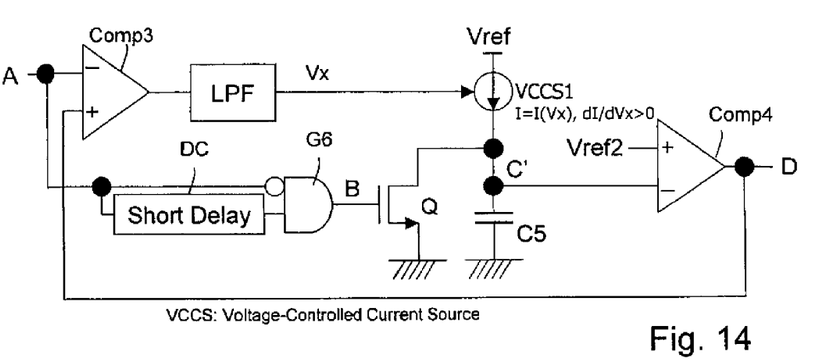

In the embodiments shown in FIGS. 13 and 14, the slopes of signal C and C' are determined by a voltage-controlled current source VCCS1. A "voltage-controlled current source" means that the current of the current source can be controlled by a voltage. In FIG. 13, signal A is delayed for a very short period of time by a short delay circuit DC. The signal generated by the short delay circuit DC and the reversed signal of signal A are inputted to an AND gate G6, and the AND gate G6 operates to generate a short pulse signal in response to the falling edge of signal A, which is signal B shown in FIG. 12. Signal B controls a transistor switch Q. When signal B is at high level, the transistor switch Q is turned ON, and the node C is pulled up to Vref, such that the output signal (signal D) of the comparator Comp4 switches to high level. When signal B is at low level, the transistor switch Q is turned OFF, and the capacitor C5 is discharged via the current source VCCS1. When the voltage at node C decreases to Vref1, the output signal (signal D) of the comparator Comp4 switches to low level. The discharge rate of the capacitor C5 (i.e., the decreasing speed of signal C) is determined by the current source VCCS1. Signal D is fed back to be compared with signal A by the comparator Comp3, and the comparison result is filtered by the low-pass filter LPF to obtain an average voltage Vx, which is used to control the current source VCCS1. Thus, the current of the current source VCCS1 is feedback adjusted to an optimum value. When the pulse width of signal D is too wide, the discharge rate of the capacitor C5 is increased, and when the pulse width of signal D is too narrow, the discharge rate of the capacitor C5 is decreased, such that the pulse width of signal D is balanced at the same pulse width of signal A in the final state.

The circuit in FIG. 14 operates similarly except it uses the charging of the capacitor. When signal B is at high level, the transistor switch Q is turned ON, and the node C is pulled down to ground, such that the output of the comparator Comp4 (signal D) switches to high level. When signal B is at low level, the transistor switch Q is turned OFF, and the capacitor C5 is charged by the current source VCCS1. When signal C' is higher than Vref2, signal D will switch from high level to low level. In this circuit, signal D is also fed back to the comparator Comp3, and the output of the comparator Comp3 is sent to the low-pass filter LPF for generating the voltage signal Vx to control the current source VCCS1. Thus, the slope of signal C' can be determined at an optimum value. In the above circuits shown in FIGS. 13 and 14, the short delay circuit DC and the logic gate G6 correspond to the edge detector 201 of FIG. 8C; the comparator Comp3, the low-pass filter LPF, the current source VCCS1, the transistor switch Q, and the capacitor C5 correspond to the duty-to-ramp circuit 203 of FIG. 8C; and the comparator Comp4 corresponds to the pulse width generator 204 of FIG. 8C.

Figure 15A:
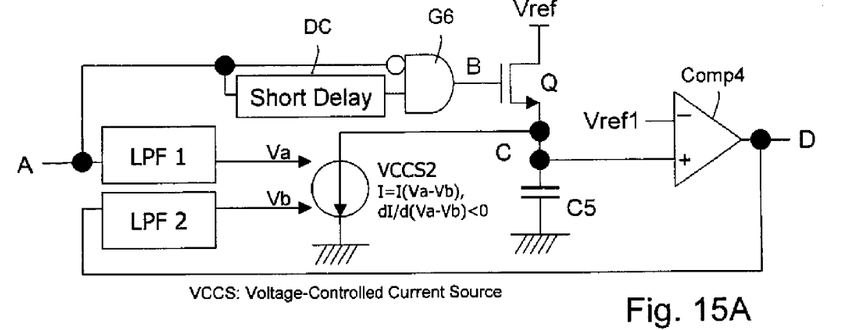

FIG. 15A shows another embodiment. In this embodiment, the feedback signal D is not directly compared with signal A. Instead, it is inputted to a low-pass filter LPF2 which generates a signal Vb, while signal A is inputted to a low-pass filter LPF1 which generates a signal Va. The signals Va and Vb are compared with each other, and the difference controls the current of a second voltage-controlled current source VCSS2 to determine the optimum slope of signal C. And the circuit in FIG. 15A can also generate signal D shown in FIG. 12 according to signal A. Similarly, the circuit shown in FIG. 14 can be modified as FIG. 15B, wherein the feedback signal D is inputted to the low-pass filter LPF2 to generate signal Vb, and signal A is inputted to another low-pass filter LPF1 to generate signal Va, and the difference thereof controls the current of the second voltage-controlled current source VCCS2.

Figure 16:
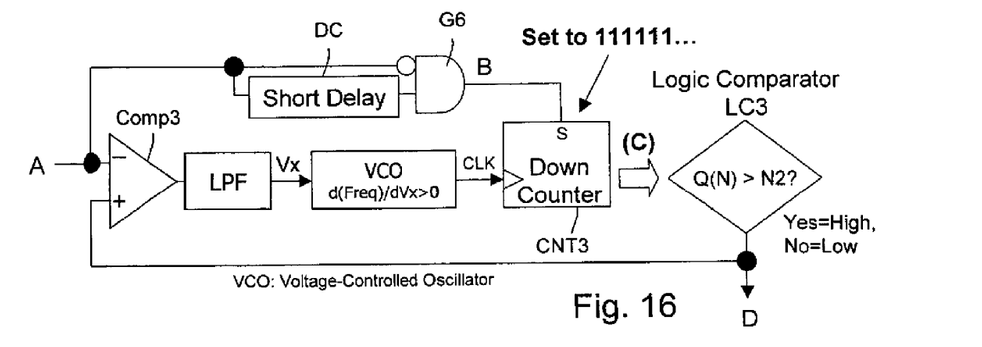

FIG. 16 shows an embodiment which embodies the same concept of FIG. 13 by a digital circuit. In FIG. 16, the down counting of the down counter CNT3 corresponds to the discharging of the capacitor C5 in FIG. 13. When signal B is at high level, every digit of the down counter CNT3 is preset to "1". This is equivalent to pulling up the voltage at node C to Vref. The discharging rate of the capacitor C5 corresponds to the counting frequency of the down counter CNT3 in this embodiment, i.e., the clock. A voltage-controlled oscillator (VCO) in the embodiment replaces the current source VCCS1 in FIG. 13. The comparator Comp3 compares signal A with the feedback signal D, and the comparison result is filtered by the low-pass filter LPF to generate the voltage signal Vx for controlling the frequency of a clock signal CLK generated by the oscillator VCO; the clock signal CLK is used as the clock for the down counter CNT3. In addition, the comparator Comp4 in FIG. 13 is replaced by a logic comparator LC3 in FIG. 16. When the output signal of the down counter CNT3 is greater than a predetermined setting N2, signal D is at high level, otherwise at low level. In this embodiment, the predetermined setting N2 corresponds to Vref2 in FIG. 14. This embodiment also generates signal D according to signal A in a similar manner as FIG. 12.

Figure 17:
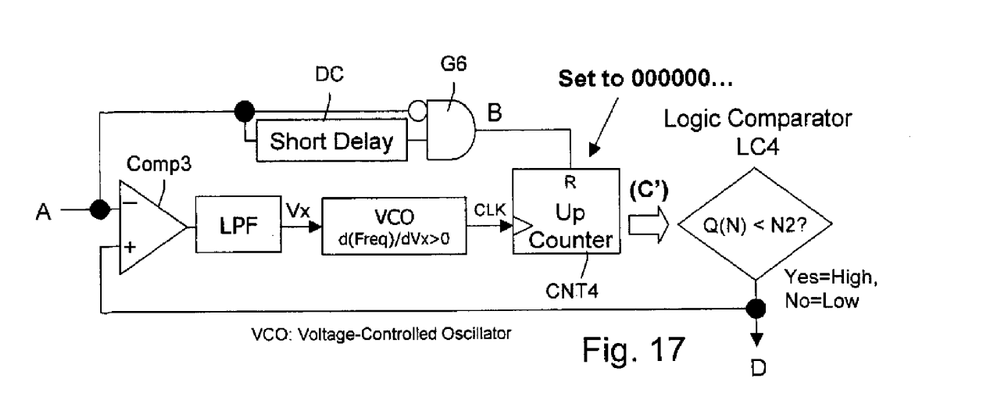

FIG. 17 shows an embodiment which embodies the same concept of FIG. 14 by a digital circuit. In FIG. 17, the up counting of the up counter CNT4 corresponds to the charging of the capacitor C5 in FIG. 14. When signal B is at high level, every digit of the up counter CNT4 is reset to "0". In this embodiment, the oscillator VCO has the same function as the one shown in FIG. 16, and in the logic comparator LC4, the predetermined setting N2 corresponds to Vref2 shown in FIG. 14. This embodiment generates signal D according to signal A in a similar manner as FIG. 12.

Figure 15B:
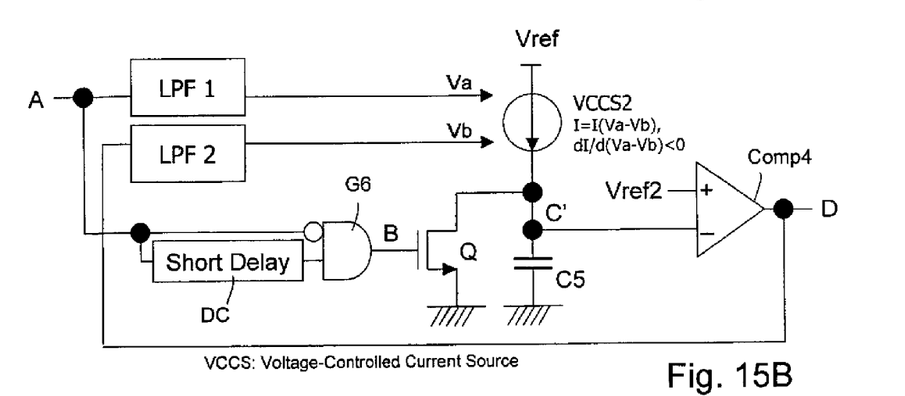
Figure 18:
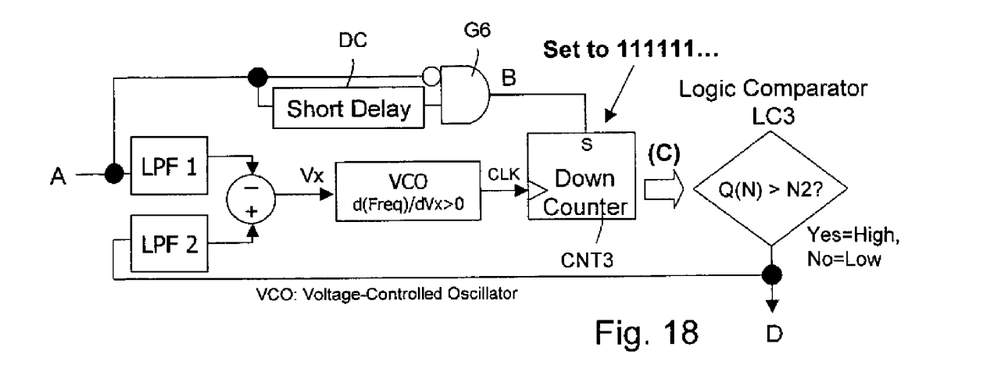
Figure 19:
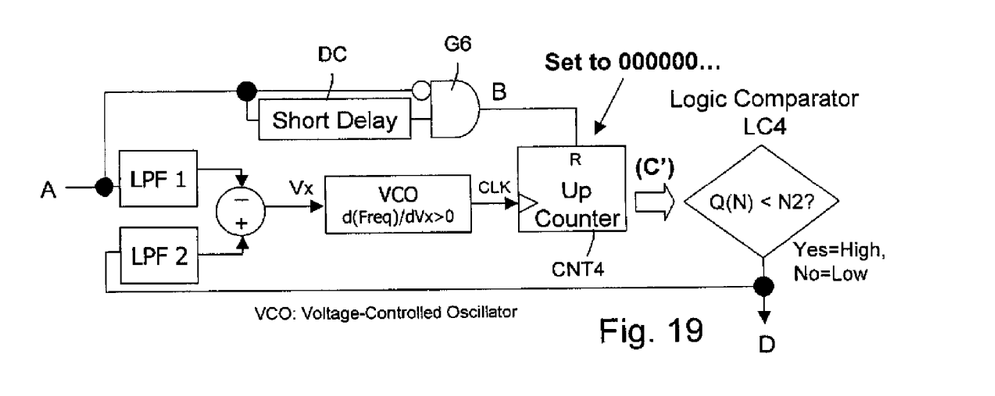

FIGS. 15A and 15B also can be transferred to digital circuits as shown in FIGS. 18-19, and the detailed explanation of their operations is omitted here.

Figure 20:
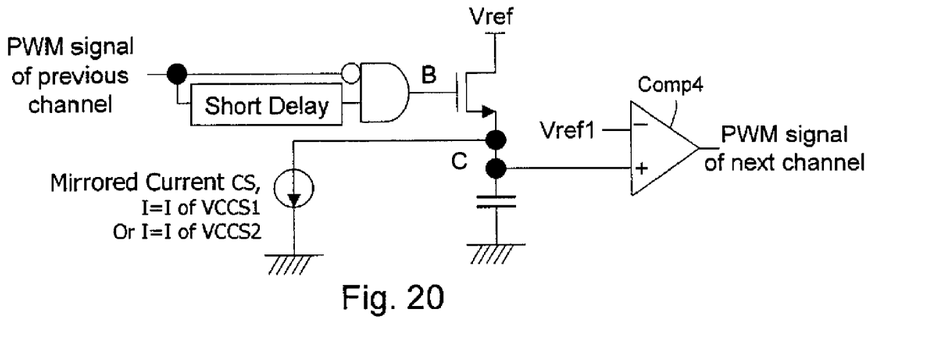
Figure 21:
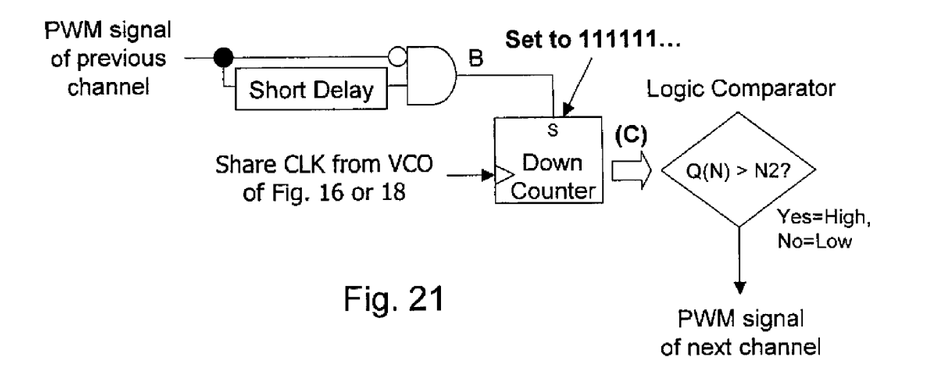
Figure 22:
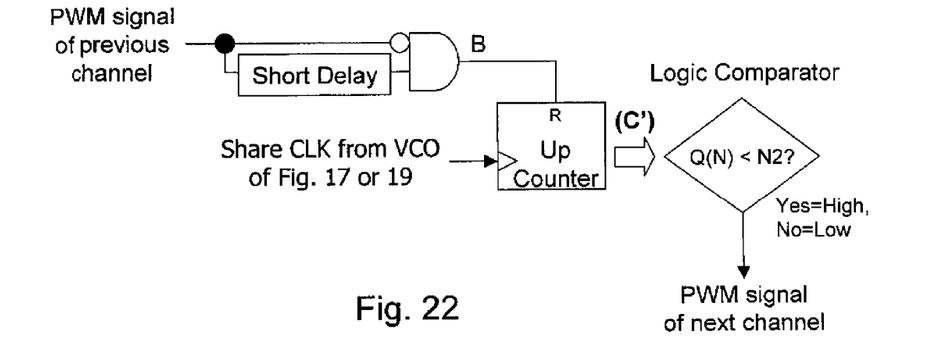

In the embodiments shown in FIGS. 13-19, a feedback loop is preferably provided. However, the feedback loop is not necessarily required in every LED channel. One feedback loop is enough for the entire circuitry. As shown in FIG. 20, in the other channels, a current mirror or any circuit capable of duplicating a current may be used, to set the current of a mirror current source CS to the same current of VCCS1 or VCCS2. Or, as shown in FIG. 21, the clock signal CLK generated by the oscillator VCO shown in FIG. 16 or 18 may be shared to the other LED channels, and the feedback loop is not required. Or, as shown in FIG. 22, the clock signal CLK generated by the oscillator VCO shown in FIG. 17 or 19 may be shared to the other LED channels, and the feedback loop is not required.

In the embodiments mentioned above, the present invention uses the falling edge of the PWM signal to trigger the ON duty of the phase-shifted PWM signal of the next LED channel. By the same spirit, the present invention also can use the rising edge of the PWM signal to trigger the ON or OFF duty of the phase-shifted PWM signal of the next LED channel.

Figure 23A:
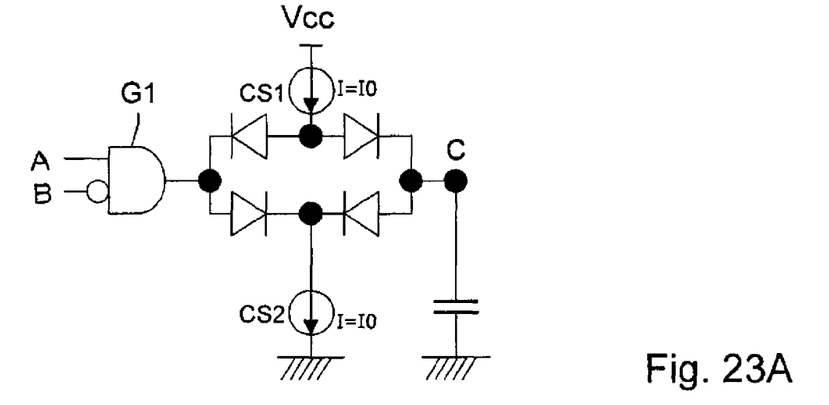
FIGS. 23A-23C show several variations of the circuit shown in FIG. 9.
Figure 23B:
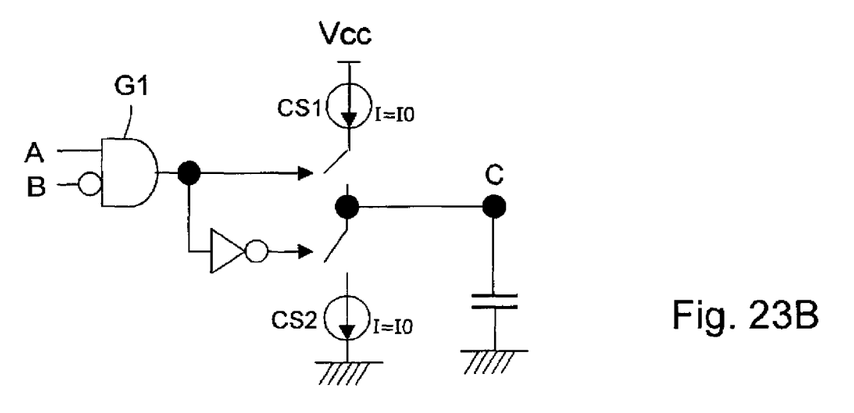
Figure 23C:
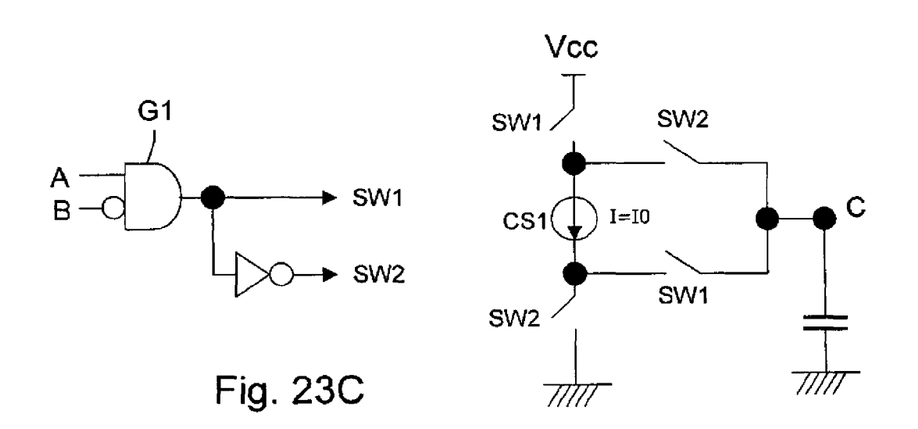

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the rising edge and high level for controlling the ON time of an LED channel can be replaced by the falling edge and low level, with corresponding amendment of the circuit in these embodiments (for example, in FIG. 12, it can be modified such that signal B is generated according to the rising edge of signal A, and the generated signal B is inputted non-reversely to the logic gate G6 in FIGS. 13-22; as such, signal D should be reversed and related circuits should be corresponding modified, etc.). In FIG. 9, the charging current source CS1, the discharging current source CS2, and four diodes (referring to FIG. 23A) can be replaced by the circuit shown in FIG. 23B or 23C. In FIG. 11, the up/down counting of the counters can be reversely arranged, and the logic comparator is modified to determine if Q(N) is less than N1. In FIGS. 13-22, the generation of the short pulse signal B is not limited to comparing the reversed signal A with the output of the short delay circuit; it can be replaced by using a high-pass filter (HPF) or by any other circuit to generate an edge-triggered short pulse signal. In view of the foregoing, the spirit of the present invention should cover all such and other modifications and variations, which should be interpreted to fall within the scope of the following claims and their equivalents.

What is claimed is:

1. An LED controller with phase-shift dimming function, comprising:
    a power circuit for supplying DC power to multiple LED channels; and
    an LED phase-shift dimming circuit for receiving an input pulse width modulation (PWM) signal and generating multiple phase-shifted PWM signals with a shifted phase between one another, wherein a turn-ON timing of each of the multiple phase-shifted PWM signals follows a turn-OFF timing of a previous PWM signal which is the input PWM signal or a previous one of the multiple phase-shifted PWM signals,
    wherein the LED phase-shift dimming circuit includes multiple delay locked loops (DLLs) coupled in series, and each DLL duplicates a PWM signal which it receives to generate the phase-shifted PWM signal with a shifted phase to the received PWM signal.

2. The LED controller of claim 1, wherein each DLL calculates a pulse width of the received PWM signal by a high frequency clock signal and generates the phase-shifted PWM signal with the same pulse width.

3. The LED controller of claim 1, wherein the LED phase-shift dimming circuit includes multiple pulse width mirrors coupled in series, and each pulse width mirror comprises:
    an edge detector for detecting a rising and/or a falling edge of a PWM signal received by the pulse width mirror;
    a pulse width memory circuit for memorizing a pulse width of the received PWM signal; and
    a pulse width generator for generating the phase-shifted PWM signal with the same pulse width as the received PWM signal.

4. The LED controller of claim 1, wherein the LED phase-shift dimming circuit includes multiple pulse width mirrors coupled in series, and each pulse width mirror comprises:
    an edge detector for detecting a rising and/or a falling edge of a PWM signal received by the pulse width mirror;
    a duty-to-ramp circuit for generating a ramp signal according to a duty of the received PWM signal; and
    a pulse width generator for generating the phase-shifted PWM signal with the same pulse width as the received PWM signal.

5. An LED phase-shift dimming circuit for receiving an input pulse width modulation (PWM) signal and outputting multiple phase-shifted PWM signals with a shifted phase between one another, the LED phase-shift dimming circuit comprising multiple delay locked loops (DLLs) coupled in series, wherein each DLL calculates a pulse width of a received PWM signal by a high frequency clock signal and generates the phase-shifted PWM signal with the same pulse width as the received PWM signal, wherein a turn-ON timing of each of the multiple phase-shifted PWM signals follows a turn-OFF timing of a previous PWM signal which is the input PWM signal or a previous one of the multiple phase-shifted PWM signals.

6. An LED phase-shift dimming circuit for receiving an input pulse width modulation (PWM) signal and outputting multiple phase-shifted PWM signals with a shifted phase between one another, the LED phase-shift dimming circuit comprising multiple pulse width mirrors coupled in series, wherein each pulse width mirror includes:
    an edge detector for detecting a rising and/or a falling edge of a PWM signal received by the pulse width mirror;
    a pulse width memory circuit for memorizing a pulse width of the received PWM signal; and
    a pulse width generator for generating the phase-shifted PWM signal with the same pulse width as the received PWM signal.

7. The LED phase-shift dimming circuit of claim 6, wherein the pulse width memory circuit includes a current source and a capacitor, and wherein the capacitor starts charging at the rising edge of the received PWM signal and stops charging at the falling edge of the received PWM signal to memorize the pulse width.

8. The LED phase-shift dimming circuit of claim 7, wherein the pulse width generator determines a pulse width of the phase-shifted.PWM signal according to the discharge time of the capacitor.

9. The LED phase-shift dimming circuit of claim 6, wherein the pulse width memory circuit includes a counter which starts counting at the rising edge of the received PWM signal and stops counting at the falling edge of the received PWM signal for memorizing the pulse width.

10. The LED phase-shift dimming circuit of claim 9, wherein the pulse width generator determines a pulse width of the phase-shifted PWM signal according to a time to reverse-count the count in the counter.

11. An LED phase-shift dimming circuit for receiving an input pulse width modulation (PWM) signal and outputting multiple phase-shifted PWM signals with a shifted phase between one another, the LED phase-shift dimming circuit comprising multiple pulse width mirrors coupled in series, wherein each pulse width mirror includes:
    an edge detector for detecting a rising and/or a falling edge of a PWM signal received by the pulse width mirror;
    a duty-to-ramp circuit for generating a ramp signal according to a duty of the received PWM signal; and a pulse width generator for generating the phase-shifted PWM signal with the same pulse width as the received PWM signal.

12. The LED phase-shift dimming circuit of claim 11, wherein the edge detector includes:
a short delay circuit for short-delaying the received PWM signal; and
a logic gate for generating a short pulse related to the received PWM signal according to the received PWM signal and an output of the short delay circuit.

13. The LED phase-shift dimming circuit of claim 11, wherein the duty-to-ramp circuit includes a current source and a capacitor, and wherein the capacitor is charged and discharged to generating the ramp signal according to an output of the edge detector.

14. The LED phase-shift dimming circuit of claim 13, wherein the duty-to-ramp circuit further includes a feedback comparator circuit for comparing the phase-shifted PWM signal with the received PWM signal and controlling the current of the current source thereby.

15. An LED phase-shift dimming control method for controlling multiple LED channels, comprising:
receiving an input pulse width modulation (PWM) signal; and
duplicating and converting the input PWM signal to multiple phase-shifted PWM signals with a shifted phase between one another for corresponding LED channels respectively, wherein a turn-ON timing of each of the multiple phase-shifted PWM signals follows a turn-OFF timing of a previous PWM signal which is the input PWM signal or a previous one of the multiple phase-shifted PWM signals,
wherein the step of duplicating and converting the input PWM signal to multiple phase-shifted PWM signals includes:
detecting a turn-ON timing of the input PWM signal;
memorizing the pulse width of the input PWM signal;
duplicating the input PWM signal to generate a first phase-shifted PWM signal with the same pulse width as the input PWM signal; and
outputting the first phase-shifted PWM signal at or after the turn-OFF timing of the input PWM signal.

16. The method of claim 15, wherein the step of duplicating and converting the input PWM signal to multiple phase-shifted PWM signals further includes: duplicating the first phase-shifted PWM signal to generate a second phase-shifted PWM signal, and outputting the second phase-shifted PWM signal at or after the turn-OFF timing of the first PWM signal.

17. The method of claim 15, wherein the step of duplicating and converting the input PWM signal to multiple phase-shifted PWM signals includes:
generating a ramp signal according to the duty of the input PWM signal;
duplicating the input PWM signal to generate a first PWM signal with the same pulse width as the input PWM signal; and
outputting the first PWM signal at or after the turn-OFF timing of the input PWM signal.

18. The method of claim 17, wherein the step of duplicating and converting the input PWM signal to multiple phase-shifted PWM signals further includes: duplicating the first PWM signal to generate a second PWM signal, and outputting the second PWM signal at or after the turn-OFF timing of the first PWM signal.

19. The method of claim 17, wherein the step of duplicating and converting the input PWM signal to multiple phase-shifted PWM signals further includes: feedback comparing the first PWM signal with the input PWM signal to control a slope of the ramp signal.

20. The method of claim 18, wherein the step of duplicating and converting the input PWM signal to multiple phase-shifted PWM signals further includes: feedback comparing the first PWM signal with the input PWM signal to generate a current for controlling a slope of the ramp signal; and in the step of duplicating the first PWM signal to generate the second PWM signal, mirror duplicating the current for controlling a slope of the ramp signal corresponding to the second PWM signal.

21. The method of claim 18, wherein the step of duplicating and converting the input PWM signal to multiple phase-shifted PWM signals includes: feedback comparing the first PWM signal with the input PWM signal to generate a clock signal for controlling a slope of the ramp signal; and in the step of duplicating the first PWM signal to generate the second PWM signal, controlling a slope of the ramp signal corresponding to the second PWM signal by the clock signal.

* * * * *